(12) United States Patent
Mayfield

(10) Patent No.: US 8,360,462 B2
(45) Date of Patent: Jan. 29, 2013

(54) FOLDING TRAILER

(75) Inventor: William Rodgers Mayfield, Opelika, AL (US)

(73) Assignee: Baxley Blowpipe Company, Inc., Dothan, AL (US)

( * ) Notice: Subject to any disclaimer, the term of this patent is extended or adjusted under 35 U.S.C. 154(b) by 0 days.

(21) Appl. No.: 12/572,253

(22) Filed: Oct. 1, 2009

(65) Prior Publication Data
US 2010/0084839 A1 Apr. 8, 2010

Related U.S. Application Data

(60) Provisional application No. 61/102,351, filed on Oct. 2, 2008.

(51) Int. Cl.
*B60D 1/54* (2006.01)
(52) U.S. Cl. .................. 280/656; 280/491.1; 280/6.151
(58) Field of Classification Search ............ 280/33.995, 280/639, 656, 6.151, 480, 480.1, 491.1, 491.3, 280/491.4
See application file for complete search history.

(56) References Cited

U.S. PATENT DOCUMENTS

| | | | | |
|---|---|---|---|---|
| 2,227,762 A * | 1/1941 | Ronning | ................. | 267/275 |
| 3,557,980 A * | 1/1971 | Klaus | ................. | 414/546 |
| 3,950,007 A * | 4/1976 | Berger | ................. | 280/6.151 |
| 4,362,316 A | 12/1982 | Wright | | |
| 4,685,855 A * | 8/1987 | Celli | ................. | 414/482 |
| 5,224,728 A * | 7/1993 | Ball | ................. | 280/476.1 |
| 5,308,213 A * | 5/1994 | Gilbertson | ................. | 414/482 |
| 5,405,160 A * | 4/1995 | Weaver | ................. | 280/477 |
| 5,474,416 A * | 12/1995 | Rogge et al. | ................. | 414/482 |
| 5,544,944 A * | 8/1996 | Keech | ................. | 298/5 |
| 5,570,898 A | 11/1996 | Albert | | |
| 5,924,836 A * | 7/1999 | Kelly | ................. | 414/482 |
| 6,520,521 B2 * | 2/2003 | Mayfield | ................. | 280/124.106 |
| 6,767,025 B2 * | 7/2004 | Hagen | ................. | 280/401 |
| 6,923,452 B1 * | 8/2005 | Zachmeier et al. | ................. | 280/6.151 |
| 6,945,744 B1 * | 9/2005 | Swanson | ................. | 414/482 |
| 7,625,166 B2 * | 12/2009 | Olson | ................. | 414/498 |
| 7,997,607 B2 * | 8/2011 | Voves | ................. | 280/408 |
| 2007/0018429 A1 * | 1/2007 | Randall | ................. | 280/491.1 |
| 2007/0029756 A1 * | 2/2007 | Quargerg | ................. | 280/447 |
| 2011/0254249 A1 * | 10/2011 | Oyasaeter | ................. | 280/491.4 |
| 2012/0020762 A1 * | 1/2012 | Roose | ................. | 414/495 |

* cited by examiner

*Primary Examiner* — Katy M Ebner
*Assistant Examiner* — Emma K Frick
(74) *Attorney, Agent, or Firm* — Kenneth M. Bush; Bush Intellectual Property Law

(57) ABSTRACT

A foldable trailer is disclosed having the folding means provided by a winch that operates in conjunction with a lifting member enabling the trailer to be winched into an upright position for storage. The load bearing surface can be made of one section or two sections that fold together to allow for more compact storage. Through the lifting member the winch provides upward motion of the front of the load bearing surface while simultaneously causing the hingeably attached tongue to fold downward; continued winching will result in a vertically folded and storable position. The invention may be applied to a tilting trailer.

14 Claims, 7 Drawing Sheets

FOLDING TRAILER

CROSS REFERENCE TO RELATED APPLICATIONS

This application claims the filing date of previously filed provisional application No. 61/102,351, filed Oct. 2, 2008.

STATEMENT REGARDING FEDERALLY SPONSORED RESEARCH OR DEVELOPMENT

Not Applicable

BACKGROUND OF THE INVENTION

This invention relates to a folding trailer more particularly to a large trailer that an individual would find difficult to stand up into the vertical position. The assistance of a winch or jack is used to enable one person to easily store the trailer from the towed position to the stored position. Fold up trailers have been disclosed previously such as that disclosed in U.S. Pat. Nos. 4,362,316 and 5,924,836. The present invention addresses limitations of each of these and provides a novel solution to simplify construction and allow a large and heavy trailer to be folded into an upright stored position.

The invention disclosed in U.S. Pat. No. 4,362,316 of Wright is most similar in structure to the present invention. A rear section of the load bearing surface folds over the axle to shorten the bed and the tongue portion folds downward as the trailer in moved into the vertical position. The tongue portion is itself foldable and rotatably connects to a point behind the rolling wheels of the trailer. This allows the operator to stand on the tongue while lifting the body of the trailer to take advantage of the weight of the operator in standing up the trailer. The limitations come as the mass of the trailer increase and the operator is no longer able to lift the trailer into the vertical position. In addition the tongue structure could be quite heavy and difficult to raise into the stored position. In fact most of the other prior art in this field relies on human power to lift the trailer into the vertical position.

A winch arrangement such as in U.S. Pat. No. 5,924,836 makes the stand up procedure very easy. But in this configuration, the load bearing surface in front of the trailer wheels must be made to have a "double joint" that would increase complexity and reduce the strength because of the reliance of pins or connectors to keep the load bearing section together during use.

BRIEF SUMMARY OF THE INVENTION

It is an object of the present invention to provide a large or heavy trailer which will fold up easily into the vertical position and store in a small space. It is also an object to provide this same convenience in the fold up and storage of a tilting trailer. A winch in conjunction with a lifting member provides the force that articulates the trailer into the vertical or stored position.

Accordingly, the present invention describes a trailer with a load carrying deck, a pair of wheels and a tongue portion for connecting to a towing vehicle. The portion of the load carrying deck behind the wheels is foldable forward to make the deck shorter for easy storage. The tongue portion is pivotally attached to a point under the forward portion of the load carrying deck.

A winch is attached to the tongue portion of the trailer. To initiate the folding process, the cable or strap is run underneath the trailer and connected to a point near the axle. A vertically disposed lifting member is connected to the front of the load bearing surface over the cable and protrudes downward to point close to the ground. Tensioning the cable imparts an upward force on the lifting member which begins the upward folding motion of the trailer. As the winch continues to be tightened, the cable tension is directed more directly toward the axle thus pulling the axle and tongue together continuing the folding motion until the trailer is in the vertical position. Loosening the cable tension will allow the trailer to descend from the vertical position down until the lifting member comes in contact with the cable. Continued unwinding will lower the chassis gently to the level towing position.

DETAILED DESCRIPTION OF THE INVENTION

Figure 1:
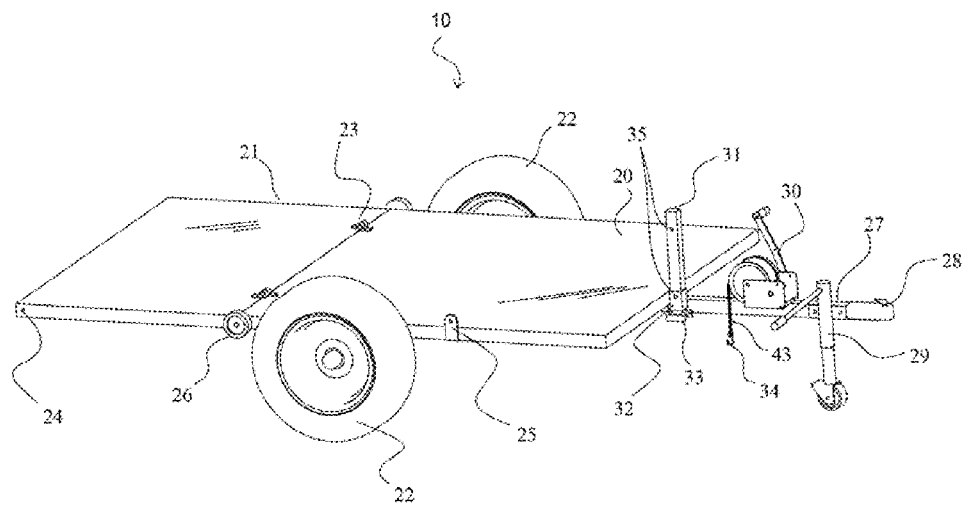
FIG. 1 shows a perspective view of a trailer according to the invention.

Describing the trailer in its preferred embodiment and referring particularly to FIG. 1, the trailer 10 has a load carrying deck or bed divided into a forward deck or bed portion 20 and a rear deck or bed portion 21 foldably divided at a location behind wheels 22. Hinges 23 above the top of the deck surface allow the rearward portion 21 to be folded over onto the forward portion 20. Rear deck portion 21 is provided with connection means 24 that corresponds to bracket means 25 on the forward deck 20 securing the forward and rearward decks together in the folded position for storage purposes. The trailer 10, like most trailers, is equipped with a tongue member 27 protruding forward of the deck and generally perpendicular to the axle of wheels 22. Tongue 27 also has hitch means 28 for connection to a towing vehicle. A standard retractable or swivel jack 29 with a wheel is provided to facilitate moving of the trailer when not being towed. A winch 30 is mounted to the upper surface of the tongue 27 with the mounted position of winch 30 shifted laterally to allow the cable or strap 43 to avoid interference with the tongue 27 when extended below the deck 20,21. The winch 30 incorporates the standard cable 43 and hook 34 for connecting to and pulling cargo onto the load carrying deck 20,21. The winch 30 will also be used to lift the trailer into the vertical stored position.

Figure 2:
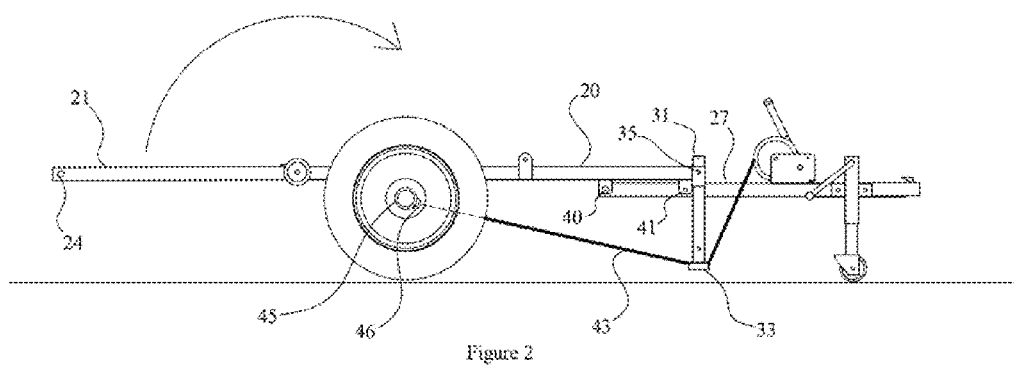
FIG. 2 shows a side elevation view of the trailer depicted in FIG. 1.

Referring to FIGS. 1 and 2, the tongue 27 is pivotally attached by bracket 40 to the underside and some distance behind the leading edge of forward deck 20. A securing bracket 41 incorporates a removable bolt or pin that when removed allows the tongue 27 to rotate downward at bracket 40 for folding up the trailer. Small wheels 26 are provided on each side of the trailer near the rear of the forward deck 20 to facilitate the folding of the trailer and also allow the trailer to be moved while in the upright folded configuration.

Figure 7:
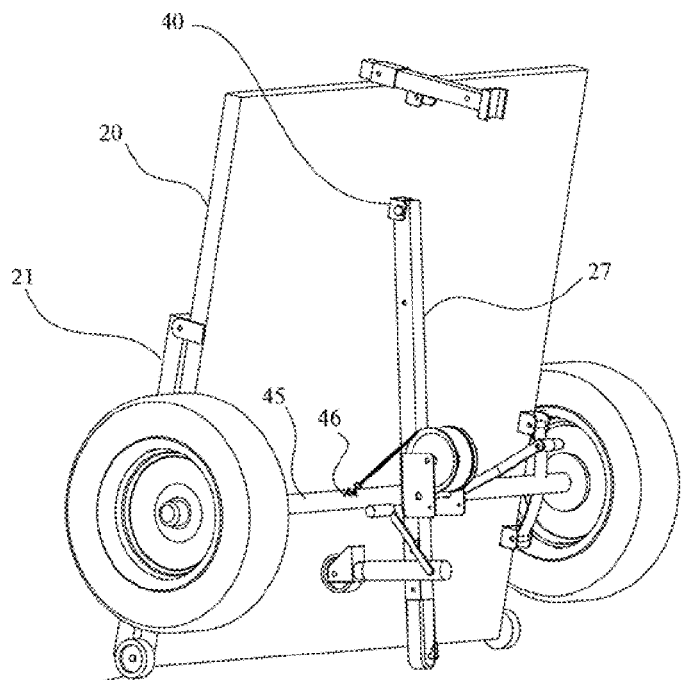
FIG. 7 shows a perspective view of a the trailer of FIG. 1 in at the fully folded vertical position.

A lifting member 31 is affixed by a pin or bolt to bracket 32 which is permanently attached at the forward central portion of forward deck 20, aligned generally along a longitudinal line with the winch 30. Lifting member 31 is provided with locating means 35 to position it in an upwardly extended position (as in FIG. 1) or in a downwardly extended position (as in FIG. 2). At the base of lifting member 31 is provided a guide 33 to keep the winch cable or strap 43 laterally located during the folding process. A cable attachment means 46 is provided at some point on the rearward underneath portion of forward deck 20. In FIG. 2, the strap attachment means 46 can be a steel loop or metal plate with a hole welded to the wheel axle 45 (see FIG. 7) generally aligned longitudinally with the lifting member 31 and winch 30.

Figure 3:
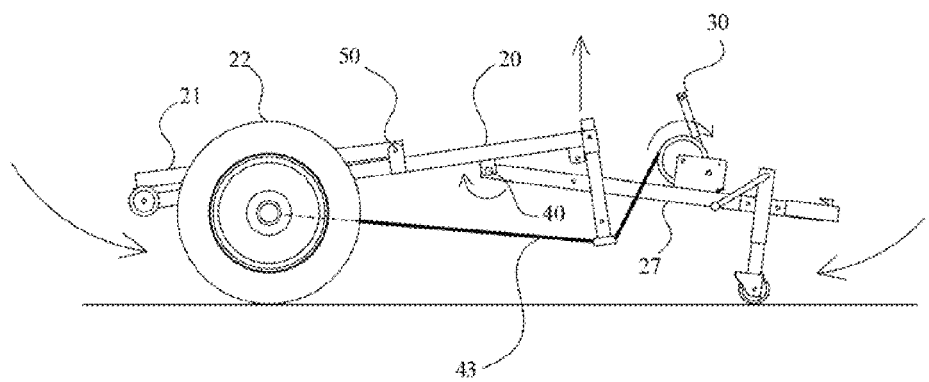
FIG. 3 shows a side elevation view of the trailer depicted in FIG. 1 as it begins the folding operation.

Referring particularly to FIG. 2 through 6, the folding process will be described in detail. FIG. 2 shows the trailer in the configuration necessary to begin the folding process. The pin or bolt of securing bracket 41 is removed to allow the tongue 27 to pivot at bracket 40. Lifting member 31 is moved from the upwardly extended position (in FIG. 1) to the downwardly extended position (in FIG. 2) and secured by pin or bolt means 35. Rear deck portion 21 is folded up and over onto the front deck portion and secured by pin or bolt means at 24 and 25 (FIG. 3 at 50). Winch cable 43 is extended underneath forward deck 20 such that it engages the downwardly disposed face of cable guide 33 at the base of lifting member 31. Cable 43 is further extended rearwardly until hook 34 can engage attachment means 46 on axle 45.

Figure 4:
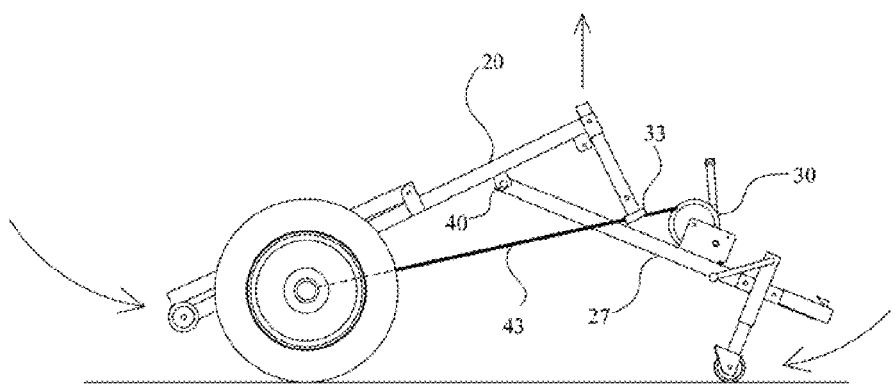
FIGS. 4 to 6 show a side elevation view of the trailer depicted in FIG. 1 in various folding stages.
Figure 5:
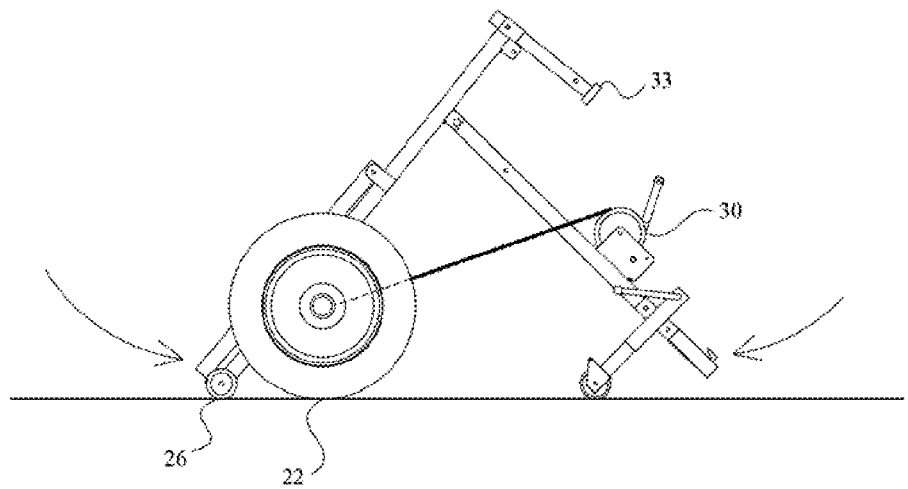
Figure 6:
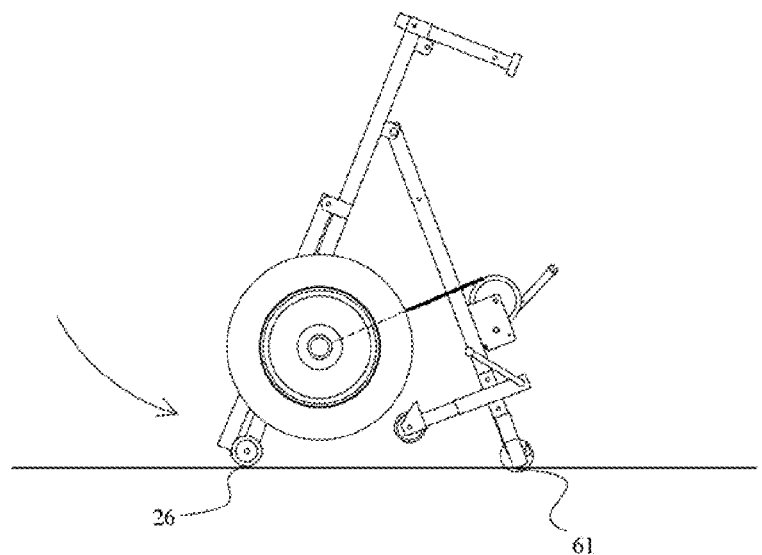

To begin the folding movement as shown in FIG. 3, winch 30 is cranked and tension is increased on strap 43, and resulting upward force is imparted to the lifting member 31 raising the forward portion of front deck 20. Tongue 27 will rotate about the attachment bracket 40 as the rearward portion of the trailer is drawn forward rolling on wheels 22. Continued cranking of the winch 30 will result in further rising of the lifting member 31 until strap 43 is substantially linear as shown in FIG. 4. Because of the elevated position of the front of forward deck 20 and the downward disposition of tongue 27, continued cranking of the winch 30 will result in continued lifting of forward deck 20 and thus lifting member 31 above strap 43 and the articulating of the trailer into an even more folded configuration. Referring to FIG. 5, as the forward deck 20 reaches a more vertical position the small wheels 26 affixed to the rear portion of forward deck 20 make contact with and roll along the ground. An alternative configuration is contemplated that has the rear folding deck 21 and forward deck 20 divided along a longitudinal line within the circumference of the road going wheels 22 so that the rear of the trailer in the folded configuration would never make contact with the ground, thus obviating the need for small wheels 26. Continued cranking brings the tongue 27 and forward deck 20 into a substantially more vertical position as shown in FIG. 6 until the desired vertical position is reached. By lifting on the tongue 27 the trailer may then be rolled along the ground on wheels 26 to a desired storage location. A caster 61 (FIG. 6) may be added to the portion of tongue 27 where it contacts the ground to allow easier movement in the folded position.

To facilitate good stability in the vertical position as well as overall height of the folded trailer, the final vertical position for storage (FIG. 7) may be determined by adjusting the length of tongue 27 and the location of pivot 40. The location of the hinged connection between decks 20,21 will also be factors in the balance and height of the folded trailer.

Figure 8:
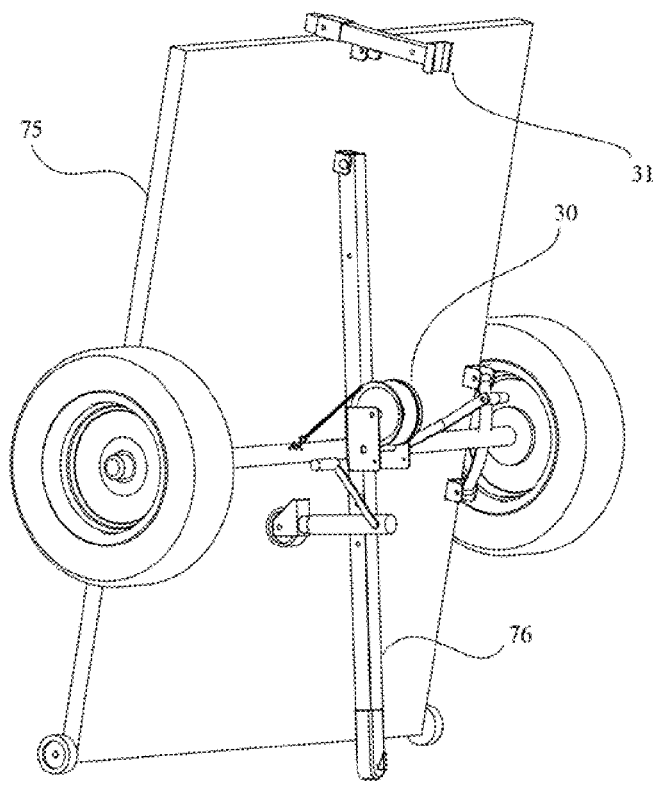
FIG. 8 shows a perspective view of a folded alternative embodiment.

In FIG. 8 an alternative configuration of the present invention is conceived where there is no separation of the deck into front and back portions. The one-piece deck 75 and tongue 76 may be folded into the vertical position (as shown in FIG. 8) by a winch and a lifting member.

Figure 9:
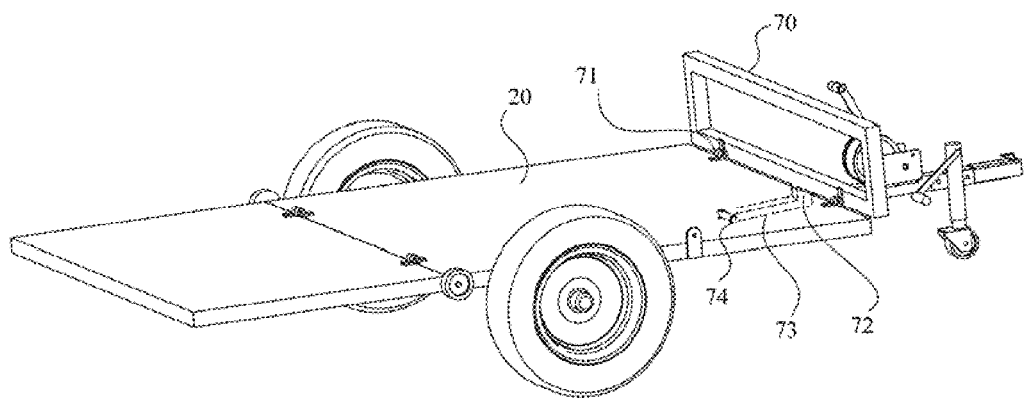
FIG. 9 shows a perspective view of an alternative embodiment of the lifting member.
Figure 10:
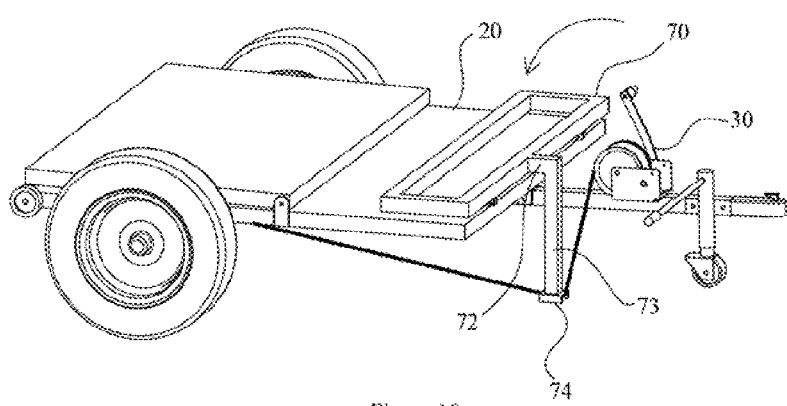
FIG. 10 shows a perspective view of the alternative embodiment of FIG. 9 with lifting member extended
Figure 11:
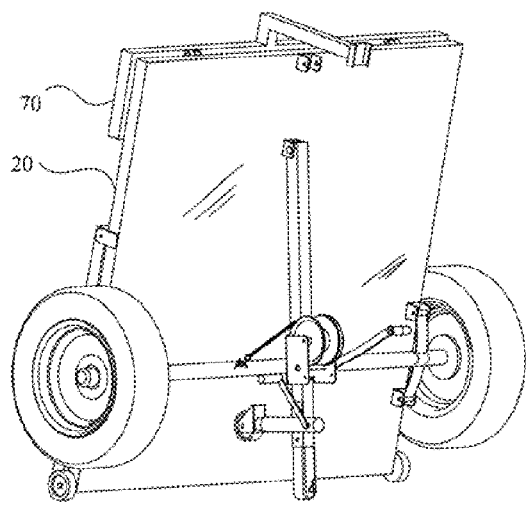
FIG. 11 shows a perspective view of the alternative embodiment of FIG. 9 in the vertical stored position.

The embodiment shown in FIGS. 9 through 11 is an alternative configuration for the present invention. The trailer embodiment in FIG. 9 is substantially the same as in FIG. 1 with the addition of a front section 70 that incorporates lifting member 73. A front rail section 70 is common on most trailers to help keep cargo on the trailer as well as provide additional structural support for the deck. In relation to the present invention, the front rail section 70 is pivotally attached along a transverse axis by hinges 71 to the front edge of forward deck 20. Protruding from the lower face of front section 70 is an offset member 72 that extends downward to a point just below the bottom of forward deck 20. A lifting member 73 is affixed to the lower end of offset member 72 and extends rearwardly parallel to forward deck 20. Lifting member 73 is located close to the bottom of deck 20 so that maximum ground clearance may be maintained. The length of lifting member 73 is slightly less than the distance from the lower face of deck 20 to the ground. A cable guide 74 is affixed to the end of lifting member 73. Referring particularly to FIG. 10, rotation of the rail section 70 onto forward deck 20 causes lifting member 73 to rotate into a downwardly vertical orientation with the cable guide 74 near the ground. In this position, the cable 43 may be attached to the appropriate points necessary for folding of the trailer. Cranking of the winch 30 puts upwards force on lifting member 73 which is resisted by the transfer of this force through the hinges 71 onto the upper surface of forward deck 20. The process of folding the trailer is the same as described for the preferred embodiment. In this embodiment no pin or bolt is necessary to affix the lifting member 73 in the position for folding. As seen in FIG. 11, the front rail section 70 remains parallel to forward deck 20 and thus a minimal profile is maintained for vertical storage.

Figure 12:
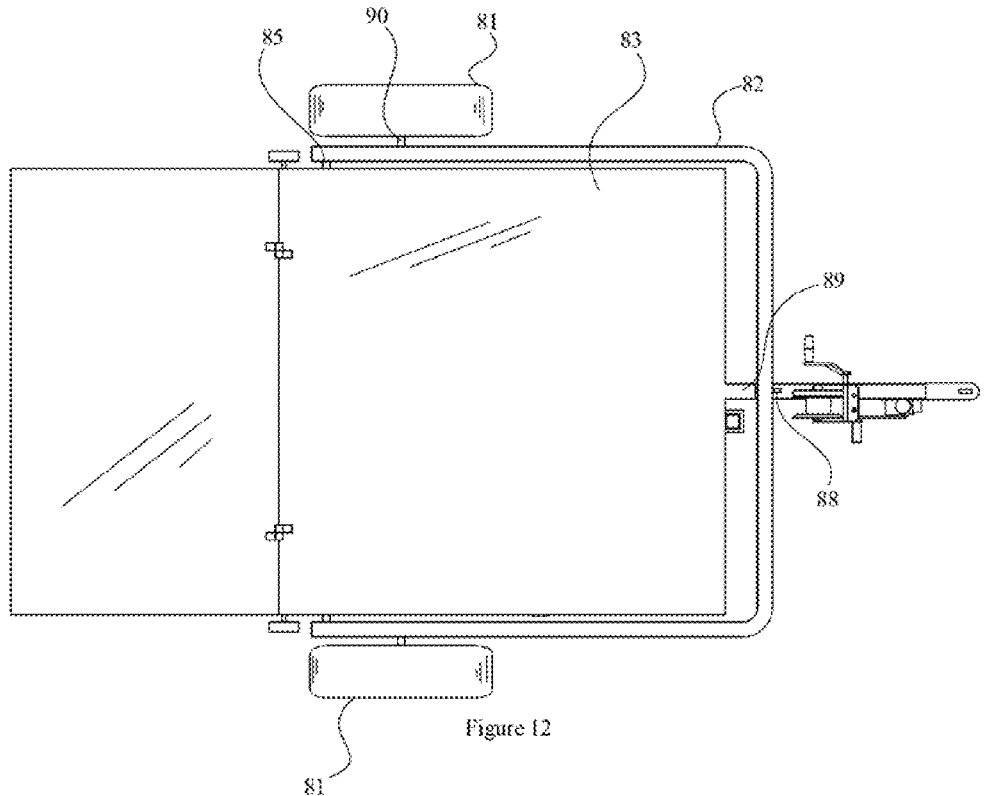
FIG. 12 is a top view of the invention applied to a tilting trailer.
Figure 13:
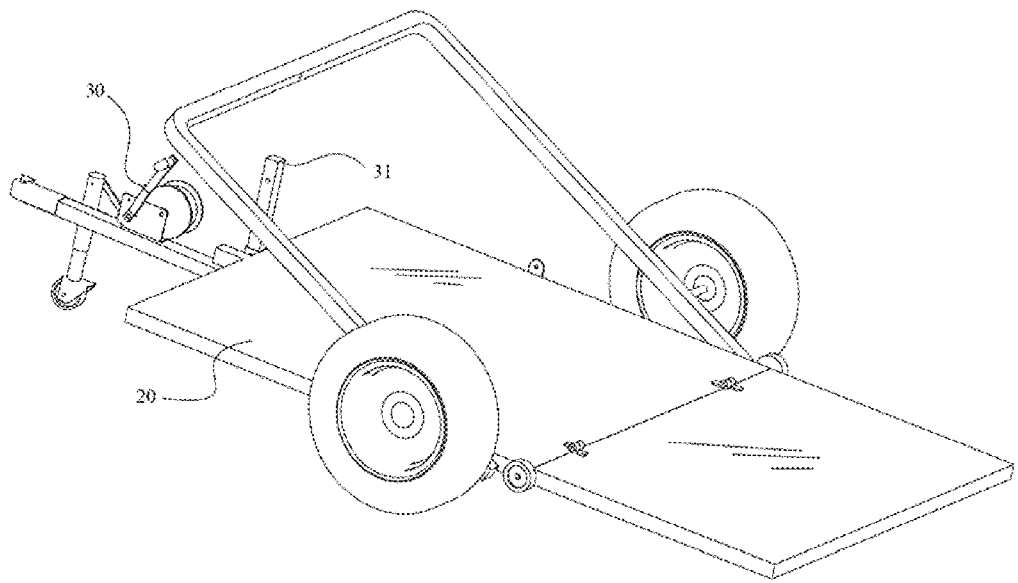
FIG. 13 is a perspective view showing the trailer of FIG. 12 in the tilted position.
Figure 14:
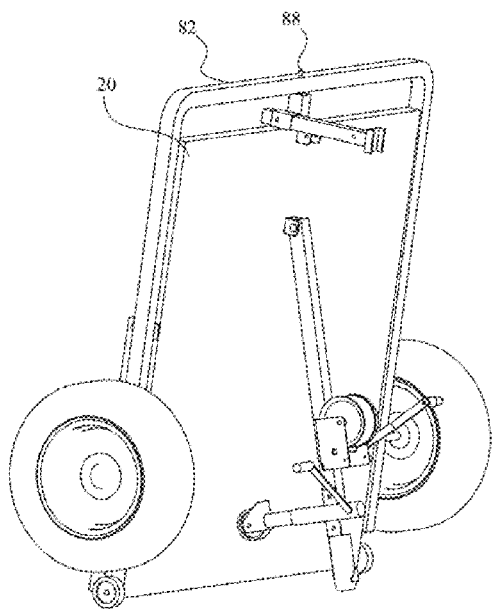
FIG. 14 shows the trailer of FIG. 12 in the fully vertical stored position.

FIGS. 12 through 14 show the present invention applied to a tilting trailer of the type with a pivoting perimeter frame with the wheel spindles offset toward the front of the trailer. In particular, FIG. 12 shows a trailer with wheels 81 affixed by spindles 90 to a u-shaped perimeter frame 82 that is pivotally attached on each side toward the rear of forward deck 83. The front of perimeter 82 is provided with means 88 for attaching to the forward portion of deck 83 (shown at 89).

FIG. 13 is the trailer of FIG. 12 shown in the tilted configuration. This titling allows cargo such as motorcycles or ATVs to be loaded easily without the use of ramps. The winch 30 can be used to assist in pulling loads onto the load carrying deck 20. When the trailer is used to haul loads, the lifting member 31 is in the up position.

FIG. 14 shows a tilting trailer with a perimeter frame in the upright folded position. The procedure for folding the trailer is the same as for the preferred embodiment described previously. The only additional step is to be sure that the perimeter frame 82 is fixed to front deck 20 by attachment means 88.

I claim:

1. A foldable trailer, comprising:
   a load carrying deck having a forward edge, a rearward edge, an upper surface and a lower surface;
   a pair of coaxial wheels rotatably attached to an axle mounted to said lower surface of said deck between said rearward edge and said forward edge;
   a cable attachment member mounted to said lower surface of said deck between said rearward edge and said forward edge;
   a tongue having a rearward end and a forward end, wherein said rearward end is pivotally mounted to said lower surface of said deck, wherein said forward end is operable to pivot forward of said forward edge of said deck for engagement to a tow vehicle, and wherein said forward end is further operable to pivot rearward of said forward edge of said deck toward said rearward edge of said deck;
   a winch mounted to said tongue, wherein said winch includes a cable having an attachment end operable to be secured to said cable attachment member; and
   a lifting member mounted to said forward edge of said deck, wherein said lifting member has a non-rotatable cable guide mounted to a lower end thereof, wherein said lifting member is movable between a first position whereby said cable guide is retracted proximal to said deck and a second position whereby said cable guide is extended below said deck proximal to the ground, wherein said cable guide is operable to engage said cable when said cable guide is in said second position;
   wherein winding said cable about said winch when said attachment end of said cable is attached to said cable attachment member and said cable guide is extended into said second position to engage said cable exerts an upward force against said lifting member and thereby vertically lifts said forward edge of said deck; and
   wherein further winding said cable about said winch draws said rearward edge of said deck and said forward end of said tongue together, thereby folding said trailer into a generally vertical orientation whereby said trailer is resting on said rearward edge of said deck and said forward end of said tongue.

2. A trailer according to claim 1, further comprising a plurality of casters attached to said rearward edge of said deck to facilitate folding and moving said trailer.

3. A trailer according to claim 1, further comprising a caster attached to said forward end of said tongue to facilitate folding and moving said trailer.

4. A trailer according to claim 1, wherein said lifting member is vertically slidable between said first position and said second position.

5. A trailer according to claim 1, wherein said lifting member is pivotable between said first position and said second position.

6. A trailer according to claim 1, further comprising a rear deck section hingedly connected to said rearward edge of said deck.

7. A trailer according to claim 1, further comprising a standard jack with a swivel wheel attached to said tongue to facilitate folding and moving said trailer.

8. A trailer according to claim 1, wherein said cable attachment member is mounted to said axle.

9. A foldable trailer, comprising:
   a load carrying deck having a forward edge, a rearward edge, an upper surface and a lower surface;
   a pair of coaxial wheels rotatably attached to an axle mounted to said lower surface of said deck between said rearward edge and said forward edge;
   a cable attachment member mounted to said axle;
   a tongue having a rearward end and a forward end, wherein said rearward end is pivotally mounted to said lower surface of said deck, wherein said forward end is operable to pivot forward of said forward edge of said deck for engagement to a tow vehicle, and wherein said forward end is further operable to pivot rearward of said forward edge of said deck toward said rearward edge of said deck;
   a standard jack with a swivel wheel attached to said tongue to facilitate folding and moving said trailer;
   a winch mounted to said tongue, wherein said winch includes a cable having an attachment end operable to be secured to said cable attachment member; and
   a lifting member mounted to said forward edge of said deck, wherein said lifting member has a non-rotatable cable guide mounted to a lower end thereof, wherein said lifting member is movable between a first position whereby said cable guide is retracted proximal to said deck and a second position whereby said cable guide is extended below said deck proximal to the ground, wherein said cable guide is operable to engage said cable when said cable guide is in said second position;
   wherein winding said cable about said winch when said attachment end of said cable is attached to said cable attachment member and said cable guide is extended into said second position to engage said cable exerts an upward force against said lifting member and thereby vertically lifts said forward edge of said deck; and
   wherein further winding said cable about said winch draws said rearward edge of said deck and said forward end of said tongue together, thereby folding said trailer into a generally vertical orientation whereby said trailer is resting on said rearward edge of said deck and said forward end of said tongue.

10. A trailer according to claim 9, further comprising a plurality of casters attached to said rearward edge of said deck to facilitate folding and moving said trailer.

11. A trailer according to claim 9, further comprising a caster attached to said forward end of said tongue to facilitate folding and moving said trailer.

12. A trailer according to claim 9, wherein said lifting member is vertically slidable between said first position and said second position.

13. A trailer according to claim 9, wherein said lifting member is pivotable between said first position and said second position.

14. A trailer according to claim 9, further comprising a rear deck section hingedly connected to said rearward edge of said deck.

\* \* \* \* \*